(12) United States Patent
Dorn et al.

(10) Patent No.: US 11,796,020 B2
(45) Date of Patent: Oct. 24, 2023

(54) LINING CARRIER FOR A DISC BRAKE

(71) Applicant: WABCO Europe BVBA, Brussels (BE)

(72) Inventors: Philip Dorn, Mannheim (DE); Ralf Grosskopf, Lobach (DE); Vitalij Scherer, Leimen (DE)

(73) Assignee: ZF CV Systems Europe BV, Brussels (BE)

( * ) Notice: Subject to any disclaimer, the term of this patent is extended or adjusted under 35 U.S.C. 154(b) by 343 days.

(21) Appl. No.: 17/253,730

(22) PCT Filed: Jun. 3, 2019

(86) PCT No.: PCT/EP2019/064280
§ 371 (c)(1),
(2) Date: Dec. 18, 2020

(87) PCT Pub. No.: WO2019/243028
PCT Pub. Date: Dec. 26, 2019

(65) Prior Publication Data
US 2021/0190157 A1    Jun. 24, 2021

(30) Foreign Application Priority Data

Jun. 20, 2018  (EP) .................................... 18178846

(51) Int. Cl.
*F16D 65/095* (2006.01)
*F16D 65/02* (2006.01)

(52) U.S. Cl.
CPC ...... *F16D 65/095* (2013.01); *F16D 2065/026* (2013.01); *F16D 2250/0007* (2013.01)

(58) Field of Classification Search
CPC ............. F16D 65/095; F16D 2065/026; F16D 2250/0007
See application file for complete search history.

(56) References Cited

U.S. PATENT DOCUMENTS

2005/0284710 A1    12/2005 Roberts et al.
2022/0163077 A1*    5/2022 Petschke ................ F16D 65/095

FOREIGN PATENT DOCUMENTS

| DE | 3041102 A1 | 6/1982 |
| DE | 202005021269 U1 | 10/2007 |
| DE | 102014017684 A1 | 6/2016 |
| EP | 0694707 A2 | 1/1996 |
| WO | 2016124171 A1 | 8/2016 |

* cited by examiner

*Primary Examiner* — Pamela Rodriguez
(74) *Attorney, Agent, or Firm* — Dickinson Wright PLLC

(57) ABSTRACT

A lining carrier (1) for a disc brake has a friction lining (2), and the lining carrier (1) is arranged in a lining carrier shaft (6) of a brake carrier (7). The lining carrier (1) has a front side (3) which faces the friction lining (2), a rear side (4) which faces away from the friction lining (2), and an edge face (5) which extends around a perimeter of the rear side (4) A region (8) of the edge face (5) that faces the lining carrier shaft (6) has a recess (9). A reinforcing rib (10; 10b) is arranged centrally on the recess (9).

14 Claims, 4 Drawing Sheets

LINING CARRIER FOR A DISC BRAKE

FIELD

The present disclosure relates to a lining carrier for a disc brake, in particular for commercial vehicle disc brakes.

BACKGROUND

Lining carriers for disc brakes are known. Lining carriers are plate-shaped and made from sheet metal or as a cast component and, in particular, are used in disc brakes for commercial vehicles.

Brake linings for disc brakes have, for example, a lining carrier (also called a brake lining carrier). A friction material (also called a friction lining in the following text) is arranged on the lining carrier. Lining carriers of this type that are equipped with a friction lining are arranged, for example, in pneumatically and/or electromechanically actuable disc brakes.

Here, the brake force is, as a rule, introduced in the case of brake application via a surface of the friction lining, which surface faces away from the brake disc, by the lining carrier being displaced in the axial direction of the disc brake and, as a result, being pressed with the friction lining against the brake disc. In the case of the brake lining bearing against the brake disc, circumferential brake forces are introduced into the disc brake, such as the brake carrier, via the edge region.

Therefore, various significant issues are related to said edge regions within the disc brake. The edge regions are subject to various loads. In the rest state, that is to say in the case of a non-actuated disc brake, the edge regions lie against or on support faces of the brake carrier and are subjected to vibrations during driving operation. In the case of braking and as the lining wear increases, the edge regions are displaced axially in the direction of the brake disc or axially in the opposite direction to the direction of the brake disc. The edge regions transmit the circumferential brake forces to the disc brake. In the case of brake release, the edge regions have to be released from the brake disc again smoothly, in order to avoid residual grinding.

Further details related to brake linings can be gathered, for example, from EP0694707A2. In order for it to be possible for the various requirements in the case of braking and in the case of the release of the disc brake to be fulfilled, very high requirements exist for the quality of the edge faces. Destruction, wear, tilting in the guides, and damage to the guide faces of the stationary part must be prevented. In this context, in particular, high requirements must be made for the dimensional accuracy, in order to avoid rattling noises and/or to ensure the displacement capability of the brake lining in every operating position.

SUMMARY

It is an object of the present disclosure to increase the service life of the friction lining that is arranged on the lining carrier and of the lining carrier with a low material outlay.

The object is achieved by an edge face of a lining carrier having a reinforcing rib axially over a width of the lining carrier, in the region of a recess. The reinforcing rib reduces stresses in the lining carrier during a brake application operation of the disc brake. During a brake application operation of the disc brake, a pressure ram presses centrally against a rear side of the lining carrier plate and presses the lining carrier with the friction lining against the brake disc.

In a further aspect, in relation to the lining carrier, the reinforcing rib flattens tangentially in the direction of the outer side of the lining carrier. To this end, the reinforcing rib has side regions. The flatter the transition of the side regions of the reinforcing rib into the recess, the more stresses are dissipated to the outside in the direction of the edge region of the lining carrier from the lining carrier center during a brake application operation of the disc brake.

In addition, it has been shown that the reinforcing rib is preferably arranged centrally in the region of half a length of the recess. The advantage is that the reinforcement of the brake carrier takes place locally only in that region of the brake carrier where the brake ram presses against the lining carrier plate. A displacement of the reinforcing rib to the left on the outside of the lining carrier or to the right on the outside of the lining carrier would have the disadvantage that the stresses in the brake carrier are not dissipated correctly during a brake application operation of the disc brake and material fatigue can occur in the lining carrier.

In a further aspect, the lining carrier has a width of greater than or equal to 9 mm. It has been shown that the service life increases exponentially in the case of lining carrier plates with an additional reinforcing rib with a width of greater than or equal to 9 mm of the lining carrier plate.

Moreover, it has proven to be an advantage that the lining carrier is configured as a cast part. Cast components are comparatively inexpensive to produce in comparison with milling and punching methods, because the casting method requires only a small amount of finishing work or no finishing work.

In a further aspect, the reinforcing rib extends beyond a radius of the recess of the lining carrier, insofar as the proportions of the disc brake allow this.

In another aspect, the reinforcing rib is configured as one piece with the lining carrier. The reinforcing rib is preferably configured with the lining carrier as a cast part. In comparison with a separate piece for the reinforcing rib, the single-piece embodiment is less expensive to produce, since no additional working steps are required, such as the production of a welded seam, in order to arrange the reinforcing rib on the lining carrier.

BRIEF DESCRIPTION OF THE DRAWINGS

In the following description, selected exemplary embodiments of the present disclosure will be described with reference to the appended figures, in which.

DETAILED DESCRIPTION OF THE DRAWINGS

Figure 1:
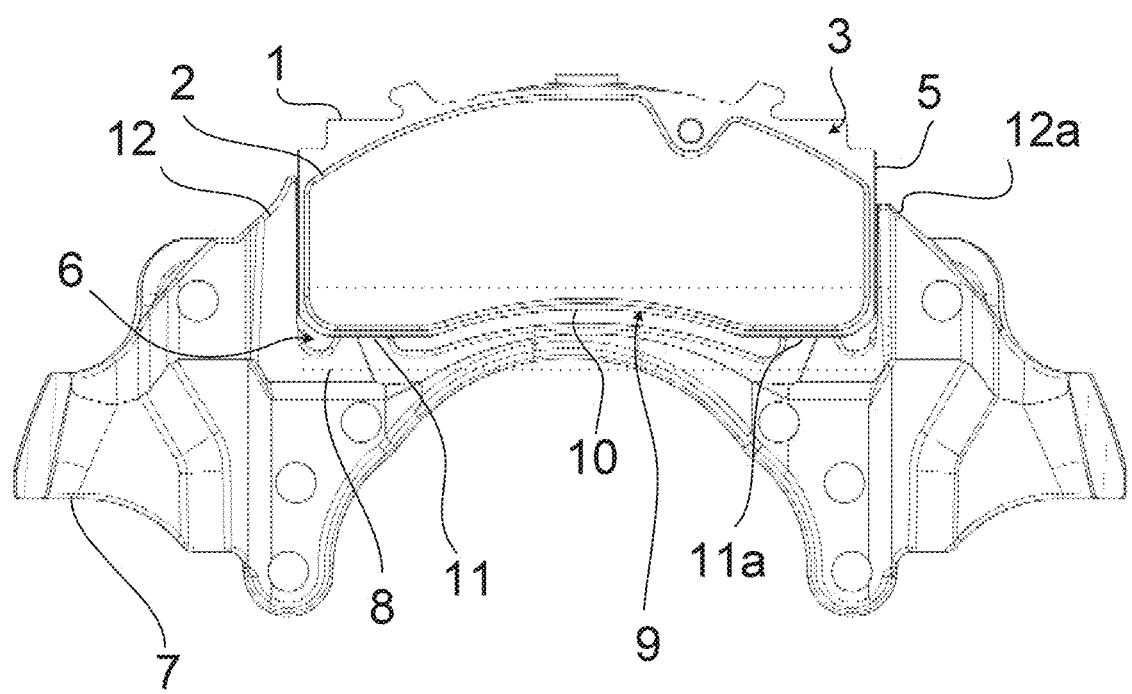
FIG. 1 shows a lining carrier which is arranged in a lining carrier shaft of a brake carrier, with a friction lining.

FIG. 1 shows a brake carrier 7 with a lining carrier shaft 6. A lining carrier 1 which is provided with a friction lining 2 is arranged in the lining carrier shaft 6. The friction lining 2 is arranged on a front side 3 of the lining carrier 1. In addition, the lining carrier 1 is supported radially (vertically) on two supporting faces 11, 11a in the lining carrier shaft 6 by way of an edge face 5 which extends around a perimeter of the lining carrier 1. The lining carrier 1 is guided laterally by way of the edge face 5 via two brake carrier horns 12, 12a. The carrier horns 12, 12a prevent the lining carrier 1 from twisting laterally out of the lining carrier shaft 6.

The edge region 5 that is arranged in the direction of the supporting faces 11, 11a of the lining carrier shaft 6 has a region 8, in which the lining carrier 1 has a recess 9. A reinforcing rib 10 is arranged centrally on the recess 9.

Figure 2:
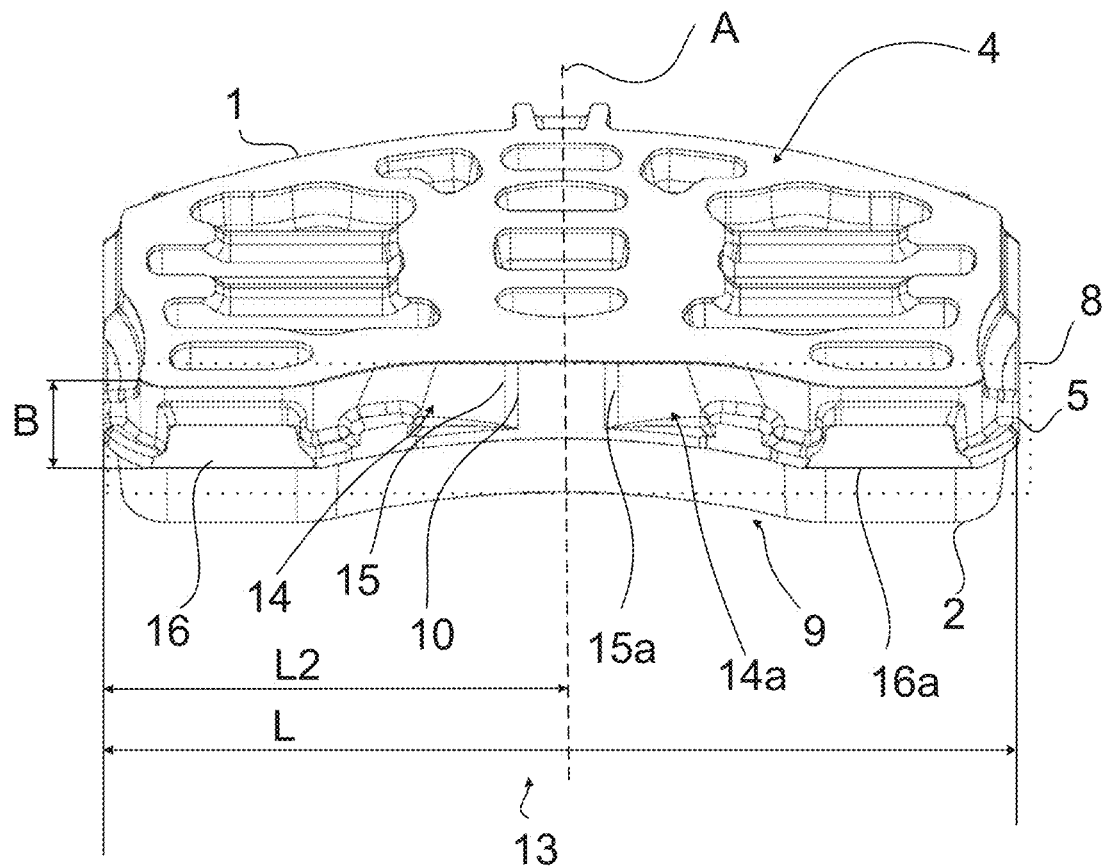
FIG. 2 shows a lining carrier from the underside.

FIG. 2 shows an underside of the lining carrier 1 according to FIG. 1 in a rotated perspective, where a rear side 4 of the lining carrier 1 and an underside 13 of the lining carrier 1 are visible. The configuration of the recess 9 and the arrangement and configuration of the reinforcing rib 10 can be seen particularly clearly. The reinforcing rib 10 extends axially along an axis A of the lining carrier 1 over an entire width B (or thickness) of the lining carrier 1. The reinforcing rib 10 is arranged centrally in the region of half a length L2 of the lining carrier 1 (or in the region of the midpoint of the overall length of the lining carrier 1). The overall length of the lining carrier 1 is defined by a length L. The reinforcing rib 10 divides the recess 9 into two part regions 14, 14a and, starting from the lining carrier 1, flattens tangentially in the direction of supporting faces 16, 16a of the lining carrier 1. There is therefore no step between the reinforcing rib 10 and the part regions 14, 14a of the recess 9. Furthermore, the reinforcing rib has two side regions 15, 15a which form the transition between the reinforcing rib 10 and the part regions 14, 14a of the recess 9.

Figure 3:
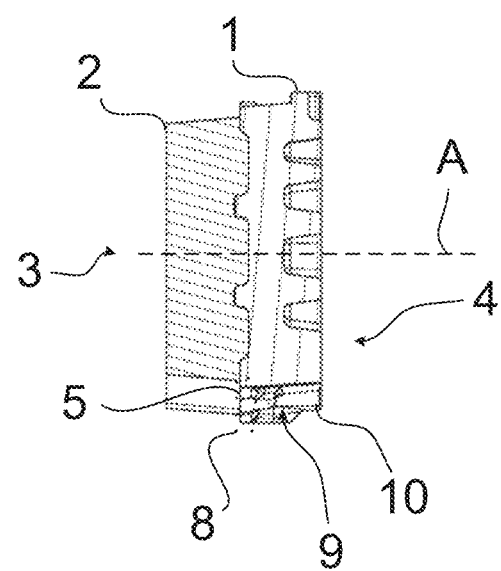
FIG. 3 shows a laterally sectioned view of a lining carrier.

FIG. 3 shows the lining carrier 1 according to FIGS. 1 and 2 in a sectioned side view. FIG. 3 illustrates the arrangement of the reinforcing rib 10 in the recess 9 of the lining carrier 1 from the side.

Figure 4:
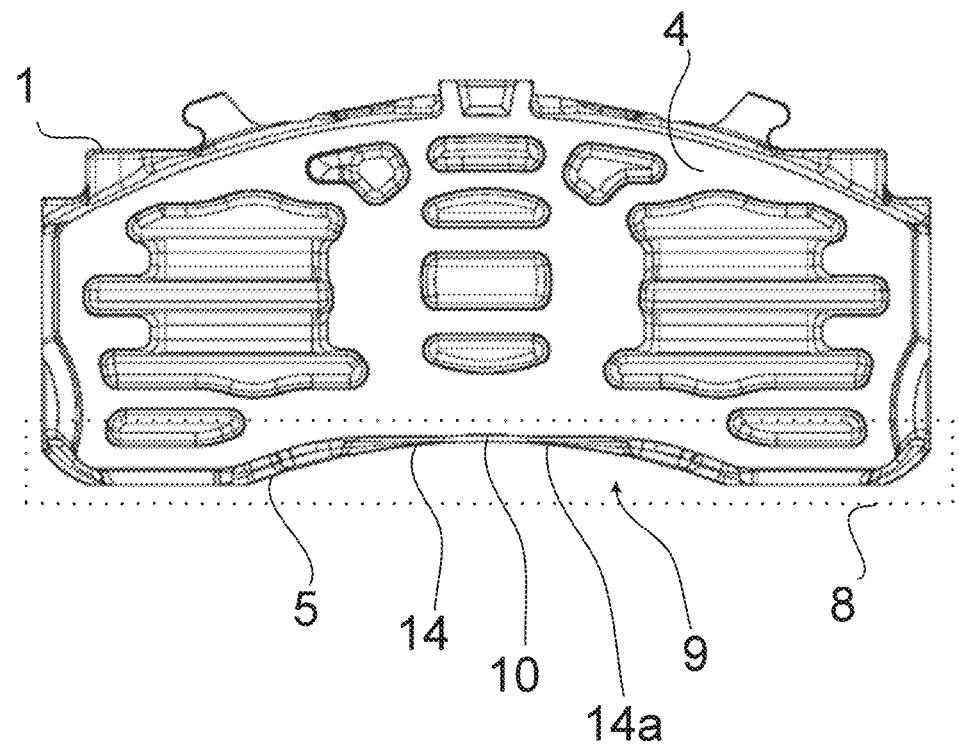
FIG. 4 shows a lining carrier from the rear side.

FIG. 4 shows the lining carrier 1 according to FIGS. 1-3 completely from the rear side 4. In particular, the flat transition from the reinforcing rib 10 to the part regions 14, 14a of the recess 9 is shown once again.

Figure 5:
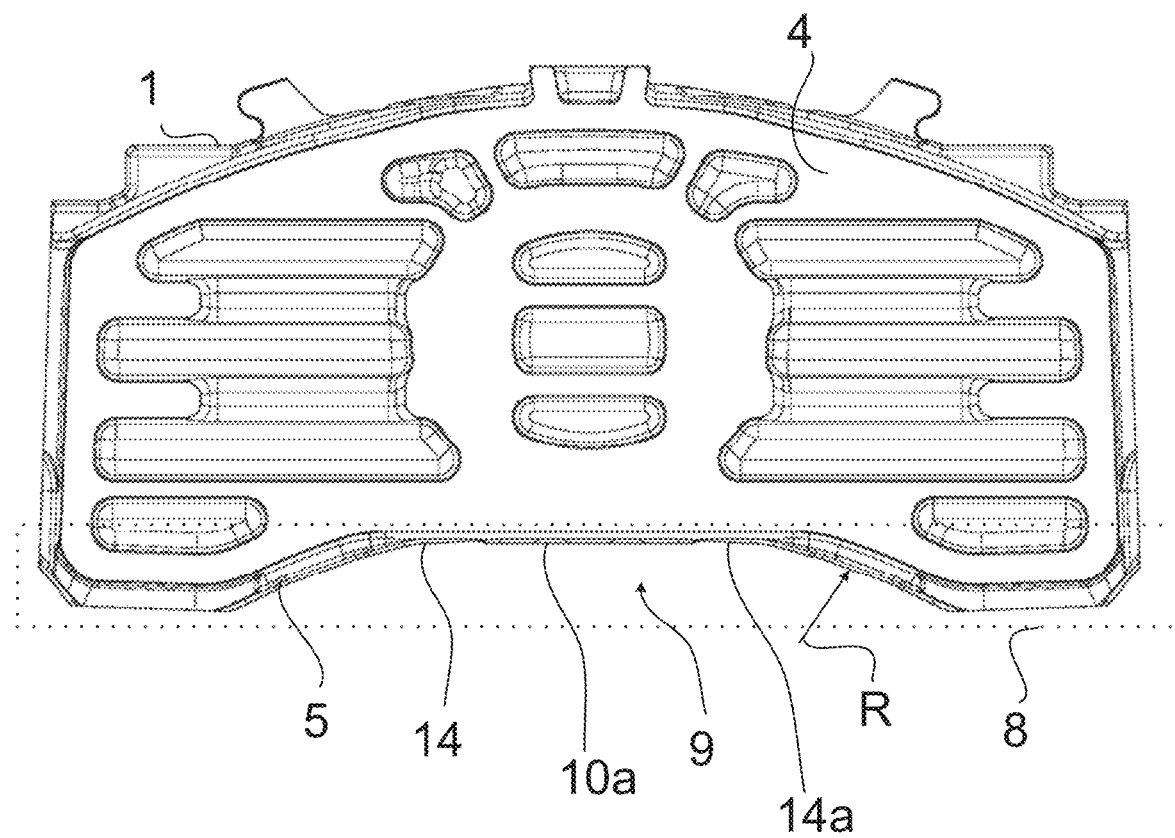
FIG. 5 shows a lining carrier from the rear side in a further embodiment of the reinforcing rib.

FIG. 5 shows, apart from a modified embodiment of the reinforcing rib 10a, a lining carrier 1 according to FIGS. 1-4 from the rear side. The reinforcing rib 10a extends beyond a radius R of the recess 9 of the lining carrier 1.

While the above description constitutes the preferred embodiments of the present invention, it will be appreciated that the invention is susceptible to modification, variation and change without departing from the proper scope and fair meaning of the accompanying claims.

The invention claimed is:

1. A lining carrier (1) for a disc brake, the lining carrier comprising:
   a friction lining (2),
   wherein the lining carrier (1) is configured to be arranged in a lining carrier shaft (6) of a brake carrier (7) and
   wherein the lining carrier (1) includes a front side (3) that faces the friction lining (2), a rear side (4) that faces away from the friction lining (2), and an edge face (5) extending around a perimeter of the rear side (4), and
   wherein a region (8) of the edge face (5) that faces the lining carrier shaft (6) includes a recess (9),
   wherein the edge face (5) includes a reinforcing rib (10; 10a) disposed axially over a width (B) of the lining carrier (1), in a region of the recess (9).

2. The lining carrier (1) as claimed in claim 1, wherein, in relation to the lining carrier (1), the reinforcing rib (10; 10a) flattens tangentially in the direction of an outer side of the lining carrier (1).

3. The lining carrier (1) as claimed in claim 1, wherein the reinforcing rib (10; 10a) is arranged centrally in a region of a midpoint of a lateral length of the recess (9).

4. The lining carrier (1) as claimed in claim 1, wherein the lining carrier (1) has an axial width (B) of greater than 9 mm.

5. The lining carrier (1) as claimed in claim 1, wherein the lining carrier (1) is a cast component.

6. The lining carrier (1) as claimed in claim 1, wherein the reinforcing rib (10a) extends beyond a radius (R) of the recess (9) of the lining carrier (1).

7. The lining carrier (1) as claimed in claim 1, wherein the reinforcing rib (10; 10a) is formed as one piece with the lining carrier (1) and defines a monolithic unitary structure with the lining carrier (1).

8. The lining carrier (1) as claimed in claim 1, wherein the reinforcing rib (10; 10a) divides the recess (14) into two part regions (14a; 14b).

9. The lining carrier (1) as claimed in claim 8, wherein the reinforcing rib (10; 10a) includes two side regions (15; 15a) that form a transition between the reinforcing rib (10; 10a) and the part regions (14a; 14b) of the recess (9).

10. The lining carrier (1) as claimed in claim 8, wherein there is no step between the reinforcing rib (10; 10a) and the part regions (14a; 14b) of the recess (9).

11. The lining carrier (1) as claimed in claim 1, wherein the reinforcing rib (10; 10a) extends over an entire axial width (B) of the lining carrier (1).

12. A lining carrier (1) for a disc brake, the lining carrier comprising:
   a friction lining (2),
   wherein the lining carrier (1) is configured to be arranged in a lining carrier shaft (6) of a brake carrier (7) and
   wherein the lining carrier (1) includes a front side (3) that faces the friction lining (2), a rear side (4) that faces away from the friction lining (2), and an edge face (5) extending around a perimeter of the rear side (4),
   wherein the edge face (5) includes an upper edge face, a lower edge face, a left side edge face, and a right side edge face, each extending from a rear side edge of the rear side to a front side edge of the front side, and
   wherein a region (8) of the edge face (5) that faces the lining carrier shaft (6) includes a recess (9),
   wherein the edge face (5) includes a reinforcing rib (10; 10a) disposed axially over a width (B) of the lining carrier (1), in a region of the recess (9);
   wherein the recess (9) is defined by the rear side edge being set back relative to the front side edge, wherein the reinforcing rib (10; 10a) is defined by a portion of the rear side edge that is set back at a smaller amount than laterally adjacent portions of the rear side edge, wherein the recess extends laterally outward from opposite sides of the reinforcing rib, such that the reinforcing rib projects from the edge face (5) within the recess in the direction of the lining carrier shaft (6).

13. The lining carrier (1) as claimed in claim 12, wherein the recess is disposed at least along the lower edge face and the reinforcing rib is disposed on the lower edge face.

14. The lining carrier (1) as claimed in claim 13, wherein the recess is also disposed along the left side edge face and the right side edge face.

* * * * *